United States Patent [19]

Syska

[11] Patent Number: 4,556,418
[45] Date of Patent: Dec. 3, 1985

[54] PROCESS FOR MELTING A FERROUS BURDEN

[75] Inventor: Andrew J. Syska, Marblehead, Mass.

[73] Assignee: Thermal Systems Engineering, Inc., Marblehead, Mass.

[21] Appl. No.: 657,121

[22] Filed: Oct. 3, 1984

[51] Int. Cl.$^4$ .............................................. C21B 11/02
[52] U.S. Cl. ........................................ 75/43; 75/44 S; 266/900; 266/140; 266/141
[58] Field of Search .................... 75/43, 44 R, 44 S; 266/900, 200, 140, 141

[56] References Cited

U.S. PATENT DOCUMENTS

| | | | |
|---|---|---|---|
| 2,002,010 | 5/1935 | Hilliard | 75/11 |
| 2,242,219 | 5/1941 | Baily | 75/12 |
| 3,029,484 | 4/1962 | Kutny | 266/141 |
| 3,219,439 | 11/1965 | Longenecker | 75/60 |
| 3,753,688 | 8/1973 | Cherny et al. | 75/43 |
| 3,802,678 | 4/1974 | Taft et al. | 75/43 |
| 3,813,209 | 5/1974 | Venetta | 432/11 |
| 4,021,192 | 5/1977 | Ferguson et al. | 432/23 |
| 4,033,562 | 7/1977 | Collin | 266/216 |
| 4,111,687 | 9/1978 | Syska | 75/13 |
| 4,132,394 | 1/1979 | Johnson et al. | 266/138 |

Primary Examiner—Melvyn J. Andrews
Attorney, Agent, or Firm—Donald E. Degling

[57] ABSTRACT

A process for melting a ferrous burden comprising scrap iron, scrap steel, pig iron, direct reduced iron or mixtures thereof without the use of coke is provided. Air or enriched air as a primary oxidant is preheated and together with fuel is combusted to form a reducing atmosphere in a shaft furnace or forehearth which melts the ferrous burden in the melting zone of the shaft furnace. The reducing atmosphere leaving the melting zone of the shaft furnace is further combusted with a secondary oxidant in the preheating zone of the shaft furnace. The top gas from the preheating zone of the shaft furnace is combusted with a tertiary oxidant to provide a heated flue gas to preheat the primary oxidant. Optionally, the heat remaining in the flue gas after preheating the primary oxidant may be recovered in a waste heat recovery device.

20 Claims, 9 Drawing Figures

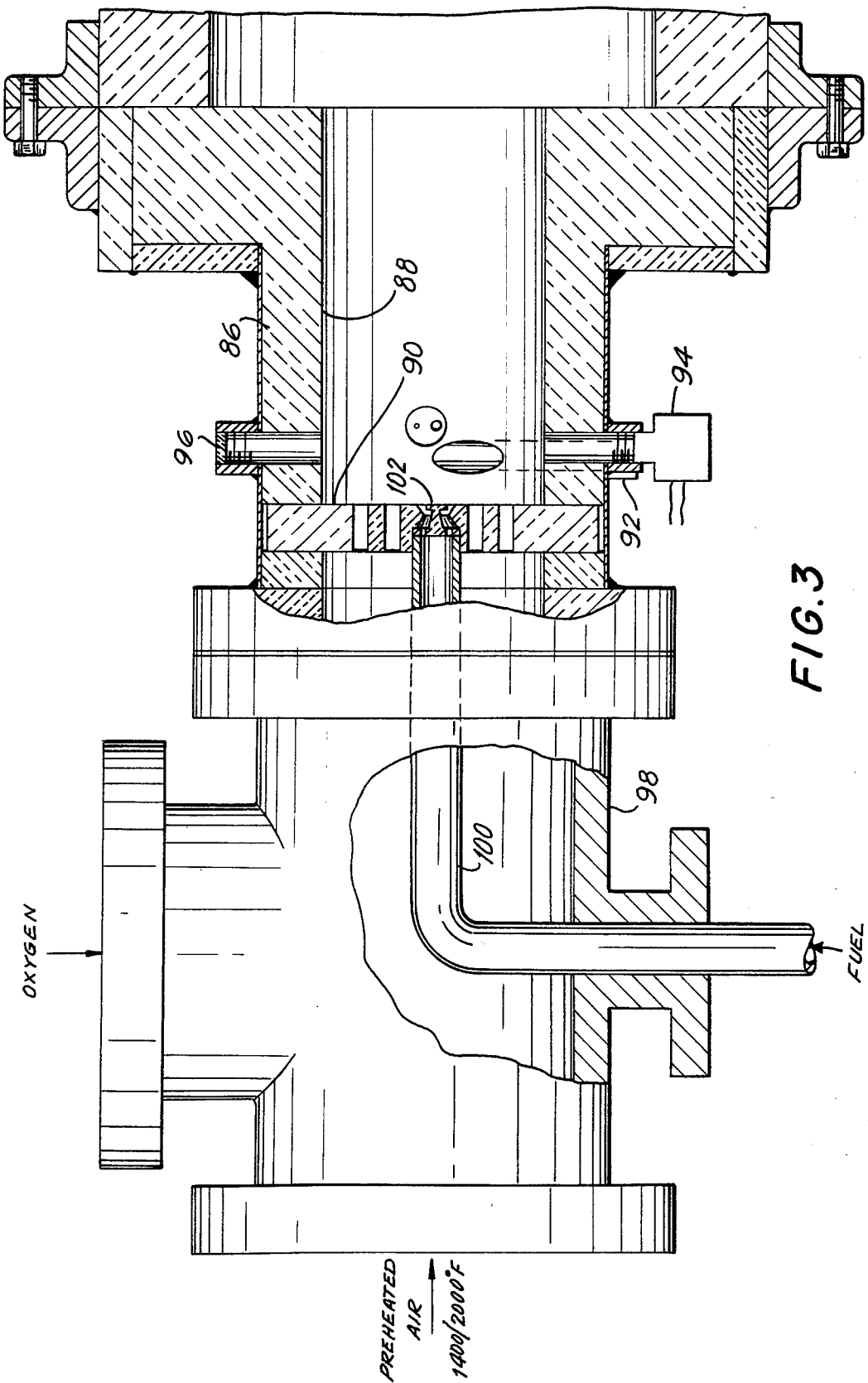

PROCESS FOR MELTING A FERROUS BURDEN

BACKGROUND OF THE INVENTION

1. Field of the Invention

This invention relates generally to the field of iron founding and steelmaking and more particularly to a process for melting iron to produce a carbon-containing hot metal from scrap iron, scrap steel, pig iron, direct reduced iron or mixtures of these ferrous materials without the use of substantial amounts of coke.

2. Description of the Prior Art

The iron founding industry is well established in the United States and throughout the world. It includes, in broad categories, the large integrated steel mills which produce a wide variety of finished steel products, the so-called mini-mills which produce a more limited range of steel products, and iron and steel foundries which produce iron and steel products from scrap iron, scrap steel or pig iron.

For the large integrated steel mills, the basic melting unit is usually the blast furnace which produces hot metal containing around 4.0% carbon together with impurities including silicon, sulfur, phosphorous and manganese from raw materials comprising iron ore, metallurgical coke and various fluxes. Smaller steelmaking plants and foundries frequently employ a cupola or an electric furnace as the basic melting unit.

The cupola is a shaft-type furnace wherein the burden comprises a ferrous material such as scrap iron, scrap steel or pig iron together with metallurgical coke and fluxes. The energy, in the form of heat, required to melt the ferrous burden is produced by combustion of the coke with air which may be preheated or enriched with oxygen. In recent years, there has been a shortage of metallurgical grade coke and its cost has increased from about $70/ton to about $175/ton. As coke comprises about 12% of the cupola charge, its cost is a matter of some concern. Additionally, the coke is a source of gaseous and particulate emissions. The energy cost to produce molten iron using a cupola is now estimated to be about $21/ton.

As a result of the raw material and pollution problems related to the cupola, the electric furnace has become more and more popular as a basic melting unit. The electric furnace may be of either the induction type or the electric arc type. In either case, the thermal energy to perform the melting function is provided by electricity. Coke, except as a possible source of carbon, is not required. Although the electric furnace avoids the problems related to the use of coke, the capital costs of the electric furnace and its associated electrical distribution system are comparable to those of the hot blast cupola. Additionally, the energy cost to melt a ton of iron in the electric furnace is estimated to be about $45, or a figure substantially in excess of that for the cupola.

The disadvantages of the cupola and electric furnace melters have engendered interest in alternative methods for melting ferrous burdens. One such alternative is the use of natural gas, fuel oil or powdered coal to fire a cupola or shaft-type furnace. Such an approach potentially avoids certain of the problems associated with the use of coke as well as the cost of electrical energy as natural gas is one of the cleanest and least expensive fuels available and its supply, at least for the foreseeable future, appears to be adequate. The use of fuel oil or pulverized coal as a source of energy is somewhat less favorable since its cost, availability and combustion equipment complexity are more difficult to predict.

The use of fluid fuel as a source of energy for a ferrous melter has been employed in the so-called "cokeless cupola" development in England, as described in Taft et al. U.S. Pat. No. 3,802,678. A process for reducing ore and then melting in a gas-fired or oil fired shaft furnace designed to operate with a reducing atmosphere is disclosed in Syska U.S. Pat. No. 4,111,687. Syska discloses the combustion of a rich fuel/oxidant mixture to produce a reducing atmosphere within the melting unit and the use of this atmosphere to preheat and reduce the charge of iron ore and to melt the reduced charge.

The present invention represents a further development of certain of the concepts set forth in U.S. Pat. No. 4,111,687.

SUMMARY OF THE INVENTION

The present invention is directed toward the production of an intermediate hot metal melted from pig iron, reduced iron, scrap iron, scrap steel, or mixtures thereof. In order to avoid losses from oxidation, special high temperature burners are provided which produce a reducing atmosphere when fed with an oxidant which may comprise preheated air or preheated enriched air. Increased efficiency is attained by further combusting the reducing atmosphere to preheat the ferrous burden in the shaft furnace and combusting the top gases in an afterburner to preheat the oxidant. Optionally a portion of the sensible heat remaining in the flue gases is recovered in a waste heat heat exchanger.

The process according to the present invention comprises introducing the ferrous burden into the upper region of a shaft furnace; introducing primary oxidant into a heat recovery device; heating the primary oxidant in the heat recovery device to a temperature in the range of 1400° to 2000° F.; introducing the heated primary oxidant together with fuel into high temperature burners located in the lower region of the shaft furnace or in a forehearth, the oxygen to carbon ratio of the primary oxidant and fuel falling within the range of 0.85 to 1.4; combusting the heated primary oxidant and fuel in the high temperature burners to produce a reducing atmosphere at a temperature in excess of 3200° F. (1760° C.) and delivering that atmosphere to the lower region of the shaft furnace, the reducing atmosphere containing carbon dioxide, carbon monoxide, hydrogen, water and nitrogen; directing the hot reducing atmosphere through the lower region of the shaft furnace to the upper region of the shaft furnace so as to melt the ferrous burden in the lower region of the furnace and to preheat the incoming ferrous burden; introducing a desired amount of secondary oxidant into the upper region of the shaft furnace; combusting a portion of the carbon monoxide and hydrogen contained in the reducing atmosphere from the lower region of the furnace with the secondary oxidant so as to produce a gas temperature at least 150° F. (83° C.) above the metal temperature at the entrance to the melting zone in the lower region of the shaft furnace and a top gas having a temperature in the range of 600° F. to 1400° F. (316° C. to 760° C.) while heating the ferrous burden to a temperature in the range of 1200° F. to 1800° F. (648° C. to 982° C.) in the preheat zone; introducing the top gas and tertiary oxidant into an afterburner; combusting the top gas and tertiary oxidant to provide a heated flue gas, and passing the heated flue gas in heat exchange relationship with the primary oxidant. If desired, the flue gas may be passed through a further waste heat recovery device.

The process according to the present invention is capable of a thermal efficency of about 50% when melting a ferrous burden comprising iron scrap which requires about 2,500,000 Btu to produce liquid iron at a temperature of about 2800° F. (1538° C.).

Further advantages of the invention will become apparent to those skilled in the art from the following detailed description of the invention and the drawings in which:

FIG. 3 is a diagrammatic view partly in section showing a high temperature gaseous or liquid fuel burner used in the process of the present invention.

DETAILED DESCRIPTION OF THE INVENTION

Figure 6:
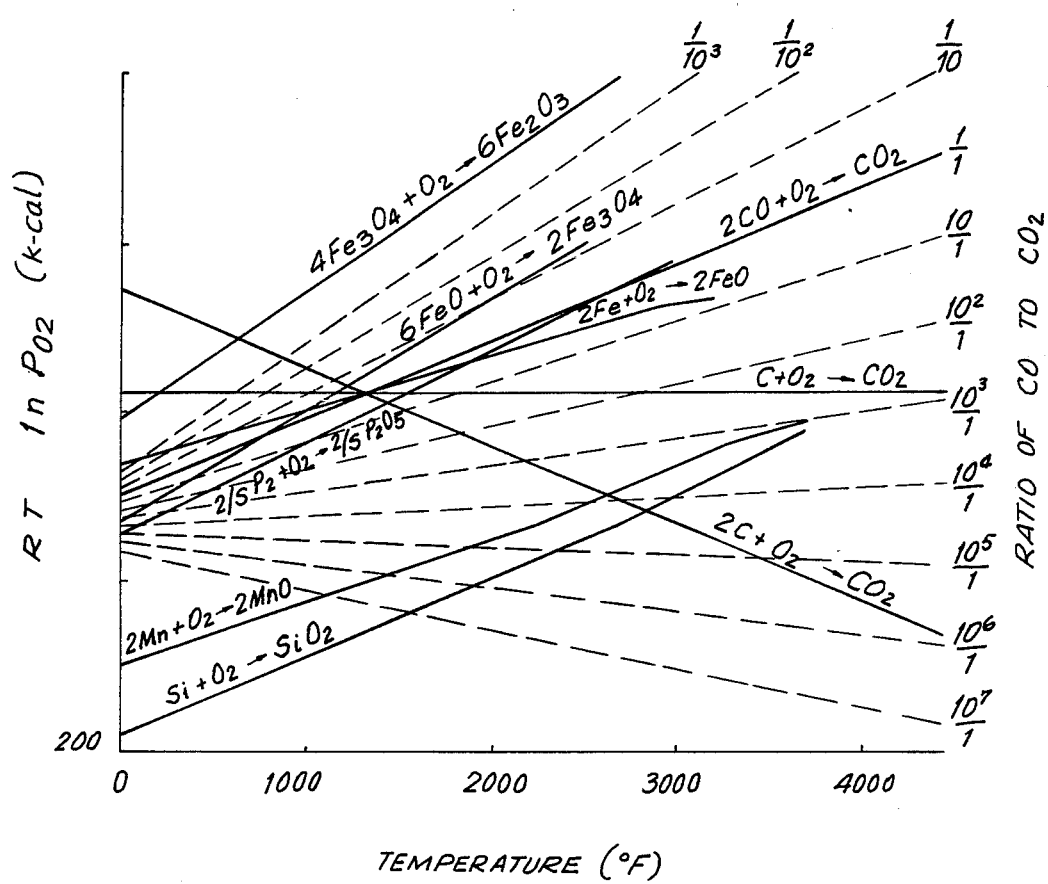
FIG. 6 is a chart showing the variation with temperature of the free energy change accompanying the conversion to one gram molecule of oxygen at one atmosphere into various oxides.
Figure 7:
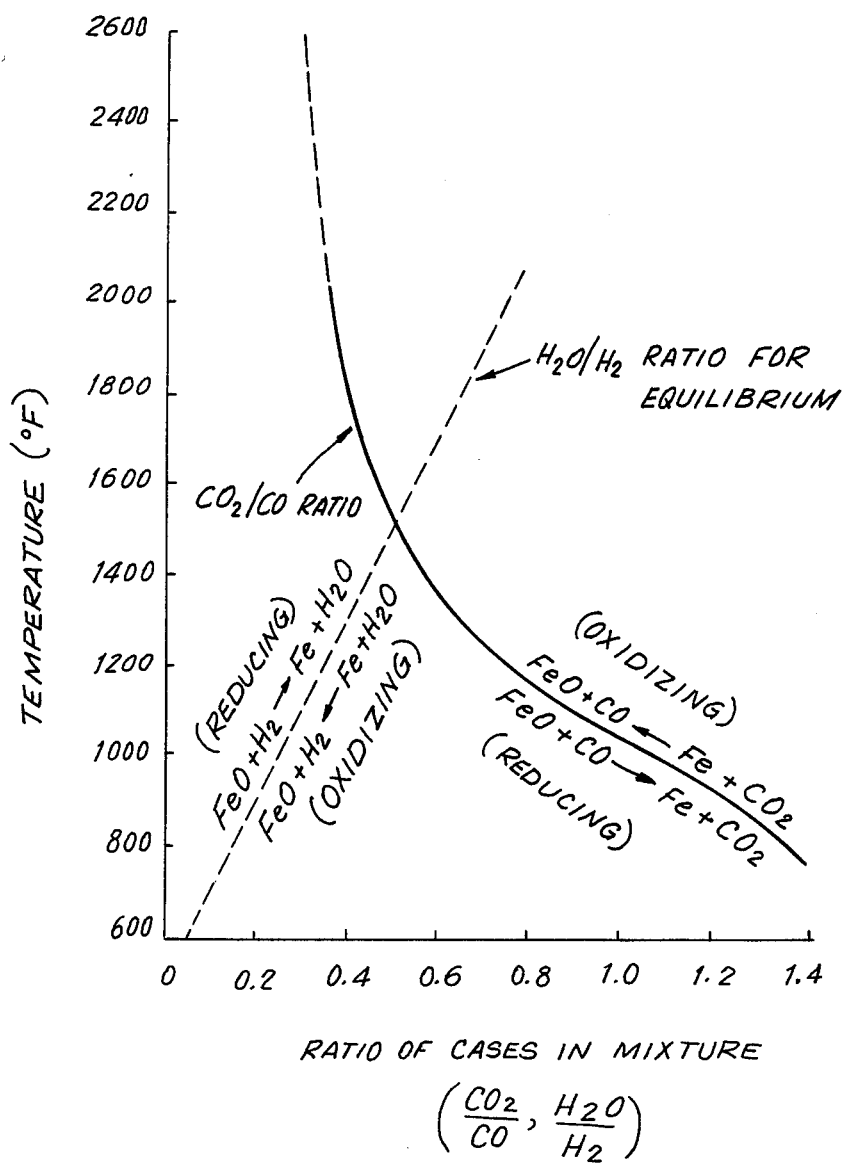
FIG. 7 is a chart showing the theoretical equilibrium relations between iron and iron oxide when in contact with hydrogen and water vapor or carbon monoxide and carbon dioxide, at various temperatures.
Figure 8:
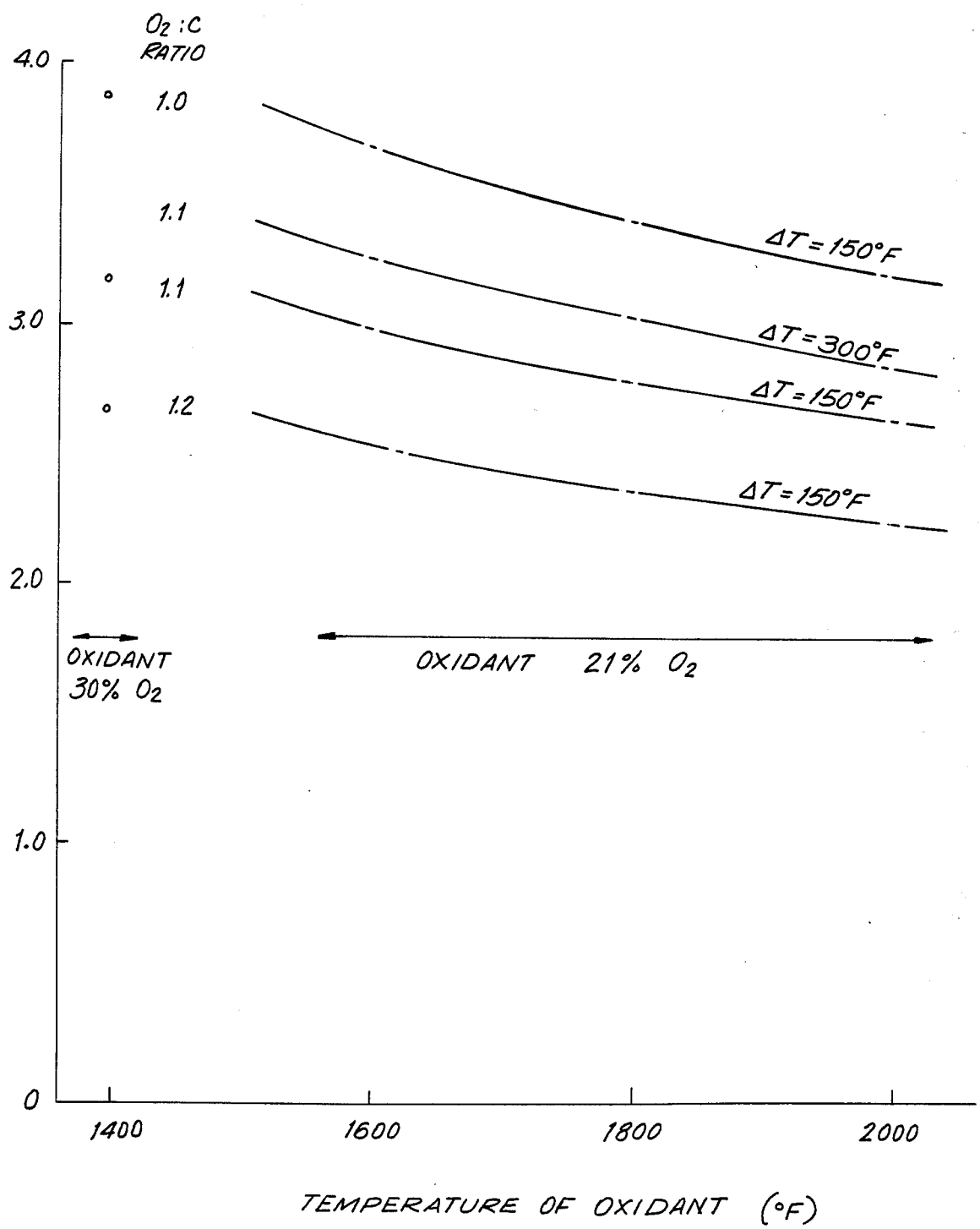
FIG. 8 is a graph showing the specific fuel consumption of a gas fired ferrous melter for several oxidant temperatures and oxygen/carbon fuel ratios.

In accordance with the object of the present invention, coke is eliminated as a fuel because of its scarcity and high cost as well as its significant contribution to pollution. Natural gas is a preferred substitute because it is readily available at reasonable cost and causes a minimum amount of pollution when combusted. Fuel oil may also be employed although its cost and availability are less predictable than those of natural gas. Finally, powdered or pulverized coal may be employed provided that appropriate consideration is given to possible problems of pollution and the effect of sulfur, commonly found in coal, on the metallurgical product. Where, as in the present case, the raw ferrous material is reduced iron, iron scrap or steel scrap as distinguished from iron ore, there is a minimum quantity of the iron oxides such as $Fe_2O_3$ and $Fe_3O_4$. However, it is important to prevent oxidation of the ferrous burden during the melting process and to minimize the oxidation of alloying elements. This implies that a reducing atmosphere must be maintained throughout the melter.

Where natural gas, essentially methane ($CH_4$), is selected as the fuel, the intermediate products of combustion are hydrogen ($H_2$) and carbon monoxide ($CO$) while the ultimate products of combustion are water vapor ($H_2O$) and carbon dioxide ($CO_2$). Hydrogen and carbon monoxide are both active reducing agents. However, the equilibrium relations between iron, iron oxide, hydrogen and water vapor vary with the ratio of water vapor to hydrogen and with temperature. Similarly, the equilibrium relations between iron, iron oxide, carbon monoxide and carbon dioxide vary with the ratio of carbon dioxide to carbon monoxide and with temperature. Both of these relationships are shown in FIG. 7. To maintain a reducing atmosphere with respect to iron oxide (FeO) at temperatures up to 2800° F. (1538° C.) the ratio of $CO_2$ to CO in the atmosphere should be below about 0.37 and the ratio of $H_2O$ to $H_2$ should be below about 1.0. This is confirmed by FIG. 6 insofar as the ratio of $CO_2$ to CO is concerned. FIG. 6 also demonstrates that when the $CO_2$ to CO ratio is reducing with respect to iron oxide (FeO) it is also reducing with respect to the higher oxides magnetite ($Fe_3O_4$) and hematite ($Fe_2O_3$). However, there may be some oxidation loss of manganese and silicon since the reduction of manganese oxide (MnO) and silicon dioxide ($SiO_2$) require very small ratios of $CO_2$ to CO, on the order of 1 to $10^4$.

While substoichiometric combustion can produce the required reducing atmosphere with respect to the oxides of iron, such oxidant/fuel ratios result in a lower adiabatic flame temperature and thus decrease the superheat attainable in the molten metal bath. It will be appreciated that the molten metal bath must be superheated to some degree to allow for unavoidable heat losses which will occur during subsequent handling of the molten metal in connection with further refining, ladle treatment or casting. In this regard it may be noted from the well-known iron-carbon equilibrium diagram that while the melting point of a eutectic composition containing 4.3% carbon is 2075° F. (1135° C.), the melting point of pure iron is 2802° F. (1539° C.). Since the ferrous burden will, in general, include significant amounts of carbon and some carbon may become available because of additions of coke or coal in the range of 1% of the charge, a molten bath temperature in the vicinity of 2800° F. (1538° C.) is adequate for the purposes of the present invention.

The theoretical adiabatic flame temperature for the stoichiometric combustion of natural gas where the oxidant is ambient air at 70° F. (21° C.) is approximately 3580° F. (1971° C.) and the observed temperature, using standard burners, is about 3450° F. (1899° C.). In the ordinary cupola where excess air is provided the combustion zone temperature is approximately 3300° F. (1816° C.). Flame temperatures may be increased by preheating the oxidant or by decreasing the nitrogen ballast. Where the oxidant is air, each increase of 100° F. (56° C.) in the preheat will produce an increase in flame temperature of about 60° F. (33° C.). Similarly, each 1% of oxygen enrichment results in an increase in flame temperature of about 65° F. (36° C.). Thus, flame temperatures in the range of 3500° F.–3800° F. (1927° C.–2093° C.) can be attained by means of air preheating or air preheating combined with oxygen enrichment.

In order to melt low carbon steels having a melting temperature in the range of 2700° F.–2800° F. (1482° C.–1538° C.) and to provide a sufficient superheat for processing purposes under sub-stoichiometric combustion conditions, the adiabatic flame temperature should be in excess of 3200° F. (1760° C.) and preferably in the range of 3600° F. to 3700° F. (1982° C.–2038° C.). Such flame temperatures require preheating of the oxidant in the range of 1600° F.-2000° F. (871° C.-1093° C.) if no oxygen enrichment is employed or preheating to about 1400° F. (760° C.) if the oxidant is enriched to about 30% oxygen.

Figure 1:
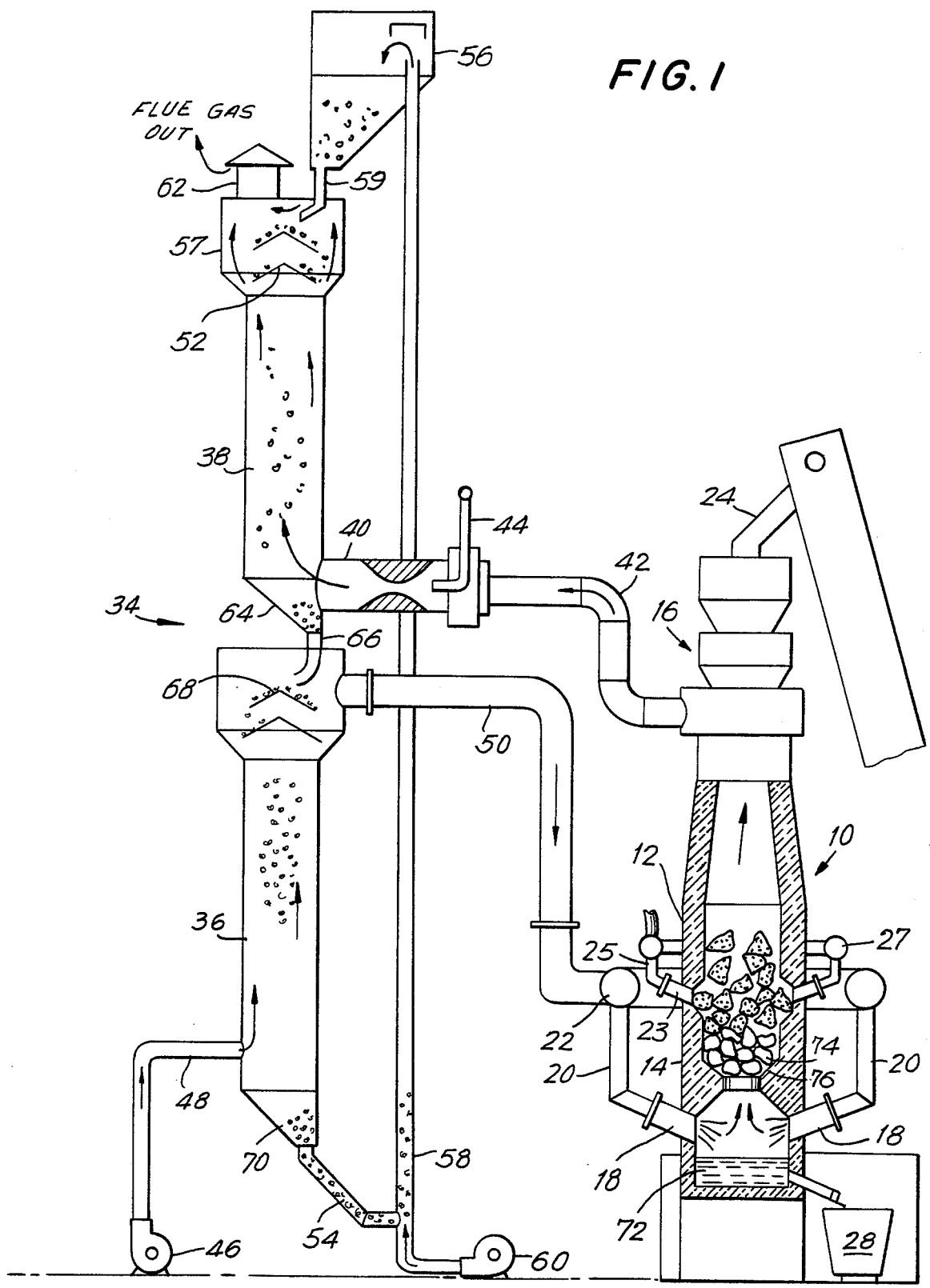
FIG. 1 is a schematic elevational view of a melting furnace and oxidant preheater used in performing the process of the present invention.

Reference is now made to FIG. 1 which illustrates in elevation apparatus arranged to perform the melting process in accordance with the present invention. The shaft furnace is designated generally at 10 and comprises an upper or preheating zone 12 and a lower or melting zone 14. A charging and gas exhaust device 16 is disposed on top of the shaft furnace 10. A plurality of high temperature burners 18 is radially disposed around the circumference of the melting zone 14 of the shaft furnace 10. Preheated oxidant for the burners 18 is introduced into the burners by means of a plurality of ducts 20 fed from a manifold 22. A plurality of secondary burners 23 is disposed about the circumference of the preheating zone 12 of the shaft furnace 10. Secondary oxidant, which may comprise air or enriched air and which may be preheated, is introduced into the burners 23 by means of a plurality of ducts 25 fed from a manifold 27. The ferrous burden together with appropriate fluxes and a small amount of coke or coal is introduced into the charging device 16 through a chute 24.

Molten metal may be tapped from the melting zone 14 of the shaft furnace 10 into a ladle 28. If desired, alloying elements or other additives may be injected into the ladle 28.

The oxidant preheating equipment is designated generally at 34 and comprises an oxidant tower 36, a flue tower 38, and an afterburner 40 together with various auxiliary equipment described in more detail below. The oxidant preheating equipment is preferably of the direct contact heat exchange type in which heat exchange media, such as ceramic pellets or shapes, are circulated in a closed loop which includes the oxidant tower 36 and the flue tower 38. The afterburner 40 receives the top gas from the gas exhaust device 16 through a duct 42 and tertiary oxidant through inlet 44. As the top gas leaving the furnace 10 still contains substantial amounts of hydrogen and carbon monoxide, combustion in the afterburner 40 can be employed to utilize fully the heating value of the top gas to preheat the primary oxidant for the burners 18.

The primary oxidant is delivered to the base of the oxidant tower 36 by a turbocompressor 46 through the primary oxidant duct 48. After passing through the oxidant tower 36 in direct contact but in counterflow heat exchange with the heat exchange media, the heated primary oxidant is delivered through duct 50 which communicates with the manifold 22. Top gas from the shaft furnace 10 is passed through the afterburner 40 and flue tower 38 in direct contact but in counterflow heat exchange with the falling heat exchange media.

The cooled direct heat exchange media are delivered from the bottom of the oxidant tower 36 by a downcomer duct 54 to a hopper-separator 56 at the top of the flue tower 38 through lift-line duct 58 by means of an air lift powered by a small blower 60.

As shown in FIG. 1, the flue tower 38 is a substantially cylindrical structure which contains, at its upper end, a cylindrical solids separator/distributor 57 having a plurality of conical flow distribution plates 52. The plates 52 serve to ensure uniform distribution of the heat exchange media falling from the hopper 56 throughout the cross section of the flue tower 38. The flue gas and lift air which enter the separator/distributor 57 of the flue tower 38 together with the heat exchange media through a downcomer duct 59 from the hopper-separator 56 leave the top of the flue tower 38 through the chimney 62. Heated heat exchange media collect in a hopper structure 64 at the lower end of the flue tower 38 after passing through the rising hot flue gas.

The heated heat exchange media are withdrawn from the hopper 64 through downcomer duct 66 and delivered to a cylindrical separator/distributor 68 located in the upper region of the oxidant tower 36 where they are distributed across the cross section of the oxidant tower 36. As the heated heat exchange media fall downwardly within the cylindrical oxidant tower 36, they contact the rising primary oxidant entering the tower through duct 48 and heat it. The cooled heat exchange media collect in a hopper structure 70 at the bottom of the oxidant tower 36. As noted above, the cooled heat exchange media are withdrawn from the separator 70 through downcomer duct 54 and returned to the hopper/separator 56 by an air lift through liftline duct 58. Utilizing top gas delivered from the shaft furnace at a temperature in the range of 600° to 1400° F. (316° C. to 760° C.), the afterburner is capable of delivering flue gas at a temperature of 2400° F. (1316° C.) or more. Primary oxidant at ambient temperatures may be heated to the range of 1400° to 2000° F. (760° C. to 1093° C.) within the oxidant tower 36.

The shaft furnace 10 as shown in FIG. 1 produces a bath of molten metal 72 in the lower portion thereof. To prevent the molten bath from being cooled by unmelted portions of the ferrous burden, ceramic burden support pieces 74 may be placed in the bottom of the shaft furnace 10. Alternatively, the burned may rest on shoulders 76 located around the inside circumference of the shaft furnace 10 above the molten metal bath.

Figure 2:
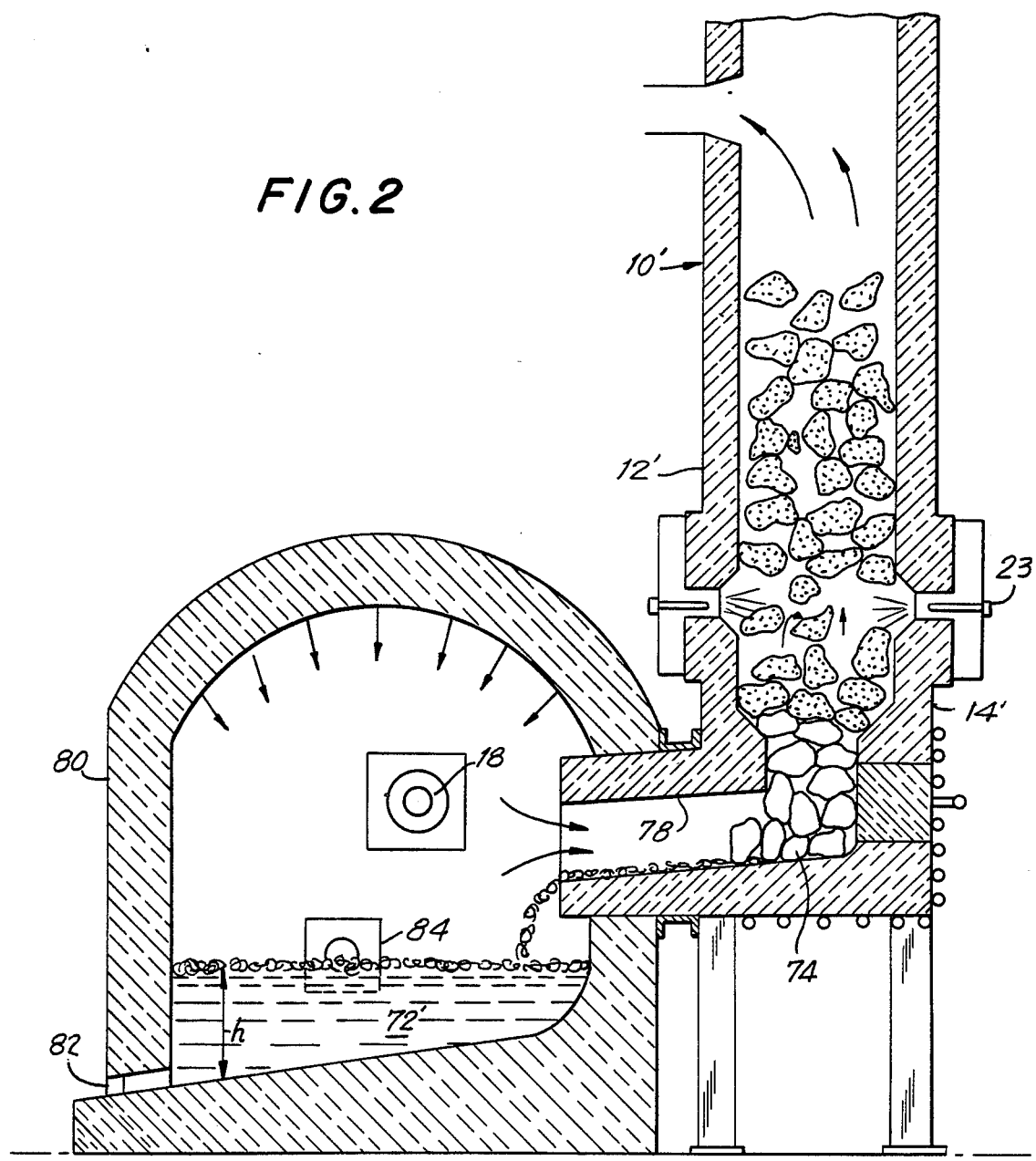
FIG. 2 is a diagrammatic cross sectional view of a melting unit for use in the process of the present invention.

FIG. 2 illustrates a modification of the shaft furnace wherein the molten metal bath is formed in a forehearth containing the high temperature burners. As shown in FIG. 2, the shaft furnace 10' includes a preheating zone 12' and a melting zone 14'. Similarly burners 23 are located around the circumference of the furnace near the bottom of the preheating zone. An enlarged outlet 78 is directed into one wall of an arched forehearth 80 made from refractory material and having a pouring spout 82 and a slag-outlet 84. The high temperature burners 18 are positioned in the walls of the forehearth above the molten metal bath 72'. The high temperature reducing atmosphere within the forehearth 80 exhausts through the outlet 78 into the shaft furnace 10'. Ceramic burden support pieces 74 may be placed in the bottom of the furnace 10' to maintain and support the ferrous burden during the melting process.

The high temperature burners 18 are shown in more detail in FIG. 3. The burner 18 comprises a substantially cylindrical body 86 formed from a refractory material and having a cylindrical port 88 formed axially therethrough. A perforated ceramic disc shaped flame holder 90 is located in the port 88 upstream of the tangential gas inlets 92 and the pilot burner 94. A sight port 96 is positioned in the burner body 86 opposite the pilot 94 in order to permit observation of the operation of the burner. Oxidant preheated to a temperature in the range of 1400°-2000° F. (760° C.-1093° C.) is introduced through one branch of a tee 98 attached to one end of the burner body 86 and moves axially through the cylindrical port 88 and the perforated flame holder 90. In the event that it is desired to increase the oxygen content of the preheated oxidant, ambient oxygen may be introduced through another branch of the tee 98. An insulated oil duct 100 may also be connected to the tee 98 and to a fuel nozzle 102 positioned on the axis of the flame holder 90. It will be appreciated that the high temperature burner 18 is adapted to use natural gas or fuel oil or a mixture thereof as the fuel and preheated air or enriched air as the oxidant. The ratio of oxidant to fuel is adjusted so that the oxygen to carbon ratio is in the broad range of 0.85 to 1.4. Preferably the ratio of oxygen to carbon is within the range of 0.85 to 1.2, while the most desired ratio is about 1.1.

Where natural gas comprising essentially methane ($CH_4$) is combusted stoichiometrically with oxygen ($O_2$), the reaction is $$CH_4 + 2O_2 \rightarrow CO_2 + 2H_2O$$

In accordance with the present invention, where air is employed at oxygen to carbon ratios of 1.0 and 1.1 the products of combustion will also include nitrogen, hydrogen and carbon monoxide and may be calculated as shown in Table 1, expressed in lb.-mols. at a temperature of 3140° F. (1727° C.):

TABLE 1

| Product | 1.0 Ratio | 1.1 Ratio |
|---|---|---|
| Nitrogen ($N_2$) | 3.76 | 4.14 |
| Carbon Dioxide ($CO_2$) | .14 | .19 |
| Water Vapor ($H_2O$) | .86 | 1.01 |
| Hydrogen ($H_2$) | 1.14 | .99 |
| Carbon Monoxide (CO) | .86 | .81 |

If the air is preheated, the flame temperature may be increased, at a 1.1 oxygen to carbon ratio, by about 60° F. (33° C.) for each 100° F. (56° C.) of preheat. Thus by preheating the air to about 1800° F. (982° C.) the flame temperature becomes about 3580° F. (1971° C.) while at 1400° F. (760° C.) preheat the flame temperature would be about 3340° F. (1838° C.). Such flame temperatures are sufficient to transfer heat effectively to the ferrous burden and maintain a bath temperature at or above 2800° F. (1538° C.). It will be noted that the atmosphere produced in the above examples has a water to hydrogen ratio below about 1.0 and a carbon dioxide to carbon monoxide ratio below about 0.37 so as to attain the required reducing character.

Figure 3A:
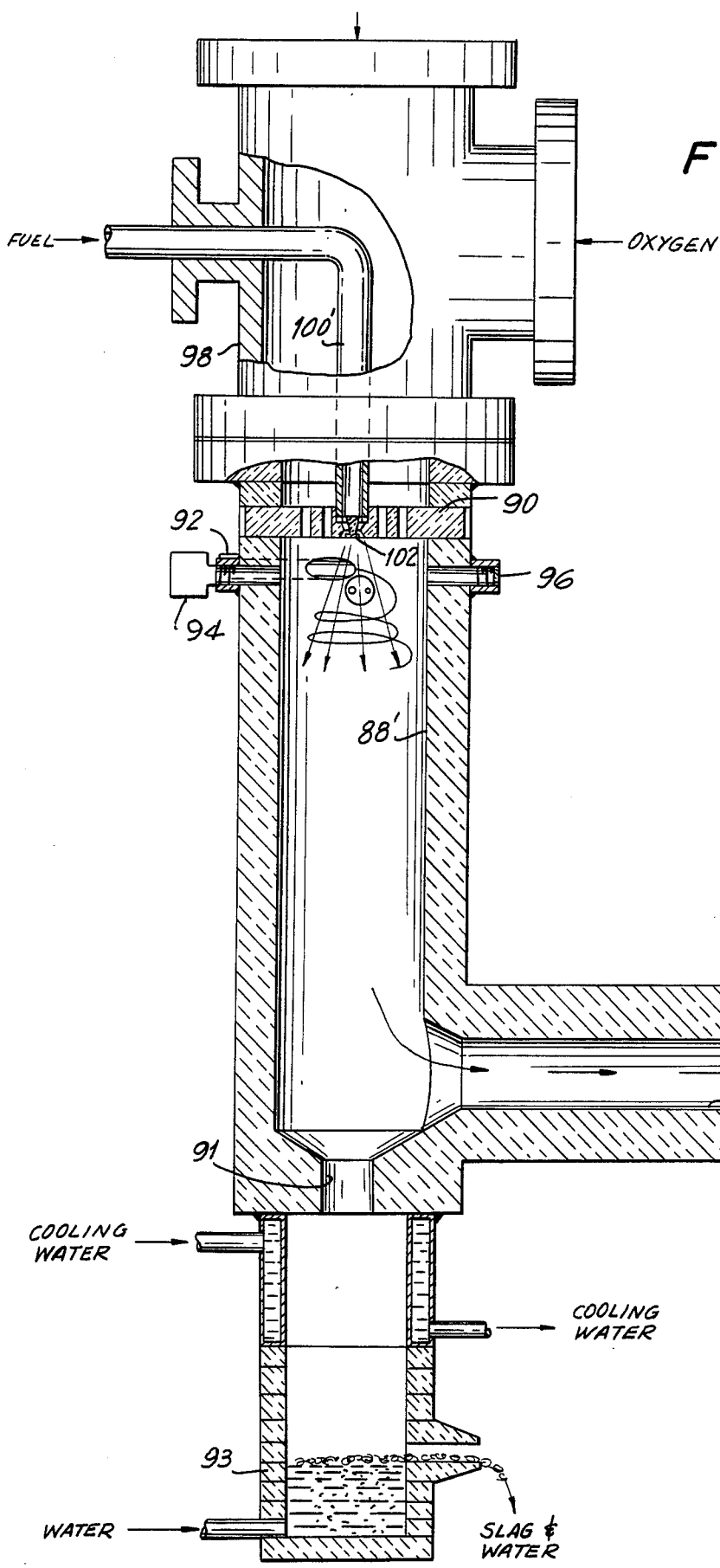
FIG. 3A is a diagrammatic view partly in section showing an alternative high temperature burner employing pulverized or powdered coal which may be used in the process of the present invention.

An alternative form of the high temperature fuel burner 18 adapted to employ pulverized or powdered coal as the principal fuel is shown in FIG. 3. Parts which are common to the burner shown in FIG. 3 bear the same indicators; modified parts are indicated by a prime ('). In the version of the burner shown in FIG. 3A, the pulverized coal is pneumatically conveyed and injected into the combustion chamber 88' through a watercooled duct 100'. During start-up of the burner, natural gas is injected through the tangential nozzles 92 and combustion commenced by the pilot burner 94. When the burner has attained its operating temperature, the natural gas flow through the nozzles 92 may be replaced by steam or an oxidant. Gas or vapor flow through the tangential nozzles 92 induces a turbulent, swirling action in the combustion chamber 88 which insures rapid and complete combustion of the pulverized coal. In contrast with he burner of FIG. 3, the burner of FIG. 3A is provided with an L-shaped extension 89 which communicates with the melting zone 14 of the furnace (FIG. 1) or the forehearth 80 (FIG. 2). The use of the L-shaped extension 89 permits the combustion chamber 88' to be positioned vertically so that slag, as a product of combustion, may leave the combustion chamber 88' through the orifice 91 and become solidified in the closed watercooled reservoir 93. Because the reservoir 93 is closed, except for the overflow of slag and water, the reaction gases comprising the products of combustion will pass out of the combustion chamber 88' and through the L-shaped extension 89 into the melting zone 14 of the furnace or the forehearth 80. When pulverized coal is used as a fuel, a somewhat larger combustion chamber should be employed to ensure complete combustion. In general, the substantially cylindrical combustion chamber can deliver between about 75,000 and 300,000 Btu per cubic foot of volume when designed to have a length to diameter ratio in the range of 4:1 to 8:1.

Pulverized coal may contain significant amounts of sulfur and, when combusted, will produce fly ash as a particulate. The sulfur may be controlled by the addition of an appropriate amount of lime to the furnace burden so that essentially no sulfur dioxide will appear in the flue gases. Similarly, the furnace burden functions as a packed tower to collect the fly ash which may not be trapped in the reservoir 93 with the slag. Thus, pollution problems frequently encountered with coal-fired processes are avoided by the present process.

Figure 4:
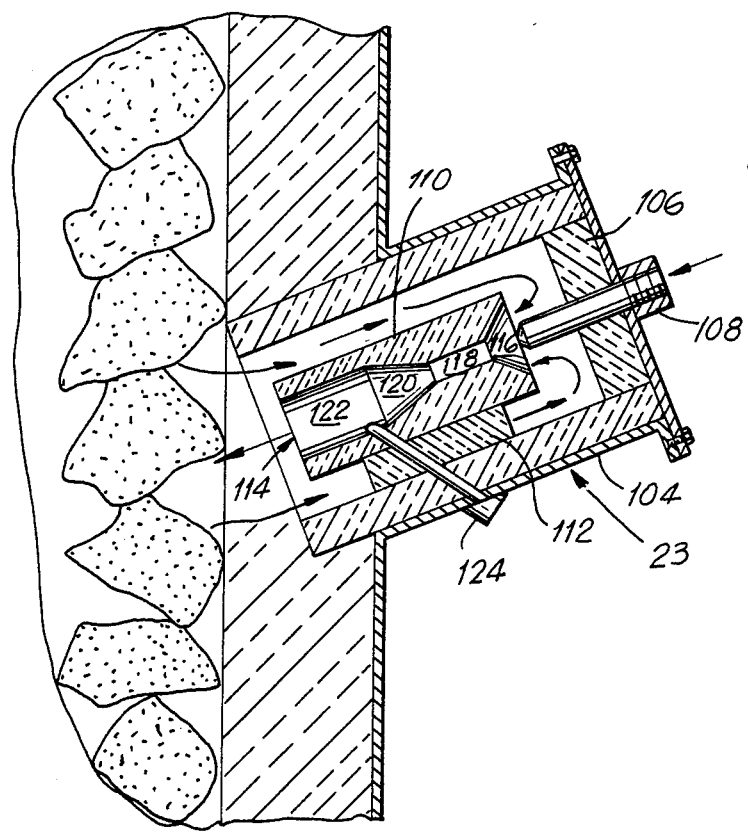
FIG. 4 is a schematic cross sectional view of a secondary burner used in performing the process of the present invention.

The secondary burners 23 are shown in more detail in FIG. 4 which shows the burner installed in the wall of the preheat zone 12 or 12' of the shaft furnace 10 or 10'. As noted above, the reducing atmosphere leaving the melting zone 14 or 14' of the shaft furnace contains substantial amounts of hydrogen and carbon monoxide which can be combusted along with additional oxidant. The burner 23 comprises an outer cylindrical body 104 made from a refractory material. The outer end of the body 104 is closed by a refractory plug 106 which carries on its axis, an oxidant nozzle 108. A mixing and combustion chamber 110 is positioned within the cylindrical body 104 by a plurality of spacers 112. The outer surface of the mixing and combustion chamber 110 is cylindrical so as to define an annular passageway between the mixing and combustion chamber 110 and the inner surface of the body 104. An axial cavity 114 is formed in the mixing and combustion chamber 110 having a converging inlet section 116, a cylindrical mixing section 118, a diverging section 120 and a cylindrical combustion chamber 122. A pilot burner assembly 124 extends into the combustion chamber 122.

In operation, secondary oxidant directed toward the mixing section 118 of the mixing and combustion chamber educts or ejects a portion of the reducing atmosphere from the shaft furnace and mixes therewith. The combustible mixture is ignited in the combustion chamber 122 and provides additional thermal energy to preheat the ferrous burden in the preheat zone 12 or 12' of the shaft furnace.

Figure 5:
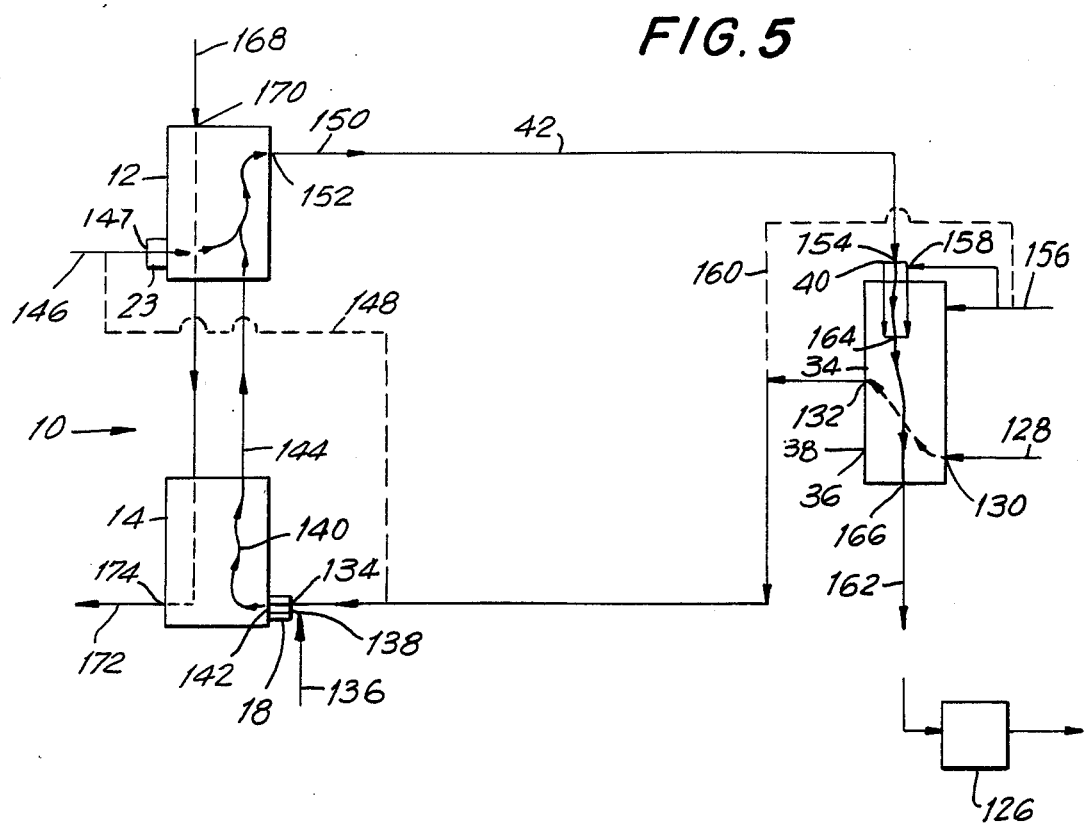
FIG. 5 is a schematic block diagram illustrating the several steps of the process of the present invention.

Reference is now made to FIG. 5 which shows in diagrammatic form a flow sheet for the process of the present invention. The blocks of FIG. 5 carry the same designations as the corresponding portions of the equipment illustrated in FIGS. 1–4 but also indicate the location of the optional recuperator or waste heat heat exchanger 126. The primary oxidant 128 at ambient temperature, e.g., 100° F. (38° C.), enters the oxidant tower 36 at 130 and leaves the oxidant tower 36 at 132 at a temperature which may range from 1400° to 2000° F. (760° to 1093° C.). The heated primary oxidant 128 enters the high temperature burner 18 at 134. The primary oxidant 128 mixes with fuel 136 which enters the burner 18 at 138. The oxygen to carbon ratio of the mixture is in the range of 0.85 to 1.2 so that the products of combustion 140 will contain substantial quantities of hydrogen and carbon monoxide whereby the products of combustion 140 will be reducing with respect to the various oxides of iron.

The products of combustion 140 from the burner 18 enter the melting zone 14 of the shaft furnace 10 at 142. The temperature of the products of combustion is in excess of 3200° F. (1760° C.). and preferably in the range of 3200° F.–3800° F. (1760°–2093° C.). Gas 144 leaves the thermal and melting zone 14 and enters the immediately adjacent preheat zone 12 of the shaft furnace 10 at an intermediate temperature in the vicinity of 1650° F. (897° C). Within the preheat zone 12 of the shaft furnace 10 the gas 144 is mixed and partially combusted with secondary oxidant 146 which enters the preheat zone 12 at 147. The secondary oxidant 146 may be ambient air, oxygen or a portion of the primary oxidant 128 as suggested by the phantom line 148 in FIG. 5. The top gas 150 leaves the shaft furnace 10 at 152 at a temperature in the range of 600°–1400° F. (316°–760° C.), preferably at about 830° F. (443° C.), through duct 42 and enters the afterburner 40 at 154. Within the afterburner 40 the remaining carbon monoxide and hydrogen contained in the top gas 150 are combusted with a tertiary oxidant 156 which enters the afterburner 40 at 158. The tertiary oxidant 156 may be ambient air or a portion of the primary oxidant 128 as suggested by the phantom line 160 in FIG. 5. Alternatively, in the event that a waste recuperator 126 is provided, the tertiary oxidant 156, or another process stream, whether or not preheated, may be further preheated in such waste recuperator.

The flue gas 162 leaves the afterburner 40, partially reacted, at 164 at a temperature of about 2200° F. (1203° C.) or greater and passes into the flue tower 38 in heat exchange relationship with the heat exchange media as described in more detail in connection with FIG. 1. During contact between the heat exchange media and the flue gas complete oxidation of the flue gas is achieved. The flue gas 162 leaves the flue tower 38 at 166 at a temperature in the range of 1700° F.–2500° F. (927°–1371° C.), depending upon the process variables.

It will be appreciated that the flue gas 162 as it leaves the flue tower 38 contains a substantial amount of sensible heat even though it is fully combusted so as to comprise principally nitrogen, carbon dioxide, and water vapor. As suggested above, a portion of such sensible heat may be used to preheat the tertiary oxidant 156. Of course, such sensible heat may also be used for other purposes not related to the present process.

The ferrous burden 168 enters the preheat zone 12 of the shaft furnace 10 through the charge device 16 at 170. The ferrous burden which may comprise direct reduced iron, pig iron, scrap iron, scrap steel or a mixture thereof is ordinarily introduced into the shaft furnace at ambient temperature and will include fluxes and, often, a small amount of coke or coal. Generally, the ferrous burden 168 is preheated to about a temperature in the range of 1200° to 1800° F. (648° to 982° C.) and preferably about 1500° F. (815° C.) prior to entering the melting zone 14. In the range of 1300°–1400° F. (706°–760° C.) a transformation of the crystal lattice of the iron occurs. This transformation from the α form to the γ form is accompanied by a decrease in the specific heat. Fuel efficiency is enhanced by the secondary combustion in the preheat zone of the furnace where the oxidation criteria are less critical. Within the melting zone 14 ceramic or refractory spheres or shapes or graphite impregnated ceramic shapes may be provided to separate the unmelted ferrous burden from the molten metal bath and promote the superheating of the molten metal bath. Molten metal 172 at a temperature of about 2800° F. (1538° C.) leaves the shaft furnace 10 at 174.

The specific energy requirement of the present process (i.e., Btu/ton of molten metal product) is determined by the thermal requirements of the melting zone. As noted above, the present process requires an hydrogen/carbon monoxide-rich atmosphere so as to maintain reducing conditions within the melting zone. Since only the sensible heat of the products of combustion from the primary burners 18 contributes to the heating, melting and superheating of the metal, a large excess of chemical energy is available for preheating the primary oxidant or for recovery as waste heat. The chemical energy of the gas leaving the shaft furnace may be recovered in the afterburner along with a portion of the sensible heat while a waste heat recovery system, may be used to recover a portion of the sensible heat at lower temperatures.

In order to minimize fuel consumption for a given melting rate and oxidant to fuel ratio, operating conditions should be selected to make possible the maximum use of the sensible heat contained in the products of combustion from the primary burners. To accomplish this, the primary oxidant is preheated, preferably, to the maximum extent practicable—e.g., about 2000° F. (1093° C.), but at least 1400° F. (760° C.). In addition, the preheat process should bring the burden up to a temperature in excess of about 1500° F. (815° C.) to assure that the transformation to γ iron is accomplished in the preheat zone. This assures that only the final heating, melting and superheating must be effected by the primary burners and that a maximum portion of the sensible heat of the primary product gas is utilized. Sufficient secondary combustion is provided so that the metal entering the thermal or melting zone is at the desired temperature of approximately 1500° F. (815° C.) and that the temperature of the gas entering the preheat zone from the melting zone be at least 150° F. (83° C.) greater than the temperature of the ferrous burden leaving the preheat zone.

Table 2 below summarizes typical computed operating data for the present process. For purposes of comparison, each example used the same ferrous burden, i.e., 2000 lbs. per hour of scrap iron plus 3% flux and 1% coke producing 36 lbs. per hour of silicon dioxide. Also, standard primary oxidant preheats of 1600°, 1800° and 2000° F. (871°, 982° and 1093° C.) were employed and the melter was operated to produce a top-gas temperature of 830° F. (443° C.). The specific data is identified as follows:

Col. 1—Temp. (°F.) of top-gas from furnace 10
Col 2—Excess of gas temperature over metal temperature at entrance to melting zone of furnace
Col. 3—Percent of oxygen in primary oxidant
Col. 4—Oxygen to carbon ratio at burner 18
Col. 5—Preheat temperature (°F.) of primary oxidant
Col. 6—Temperature (°F.) of the flue gas entering flue tower 38
Col. 7—Fuel Efficiency (%)
Col. 8—Flame temperature (°F.) at burner 18
Col. 9—Gas consumed (SCF) per ton of molten metal

TABLE 2

| 1 Topgas °F. | 2 Gas/Metal °F. | 3 % O₂ in oxidant | 4 O₂:C Ratio | 5 Oxidant Preheat °F. | 6 FLG to H/E °F. | 7 Fuel Eff. % | 8 Flame Temp °F. | 9 Gas Per Ton SCFH |
|---|---|---|---|---|---|---|---|---|
| 830 (443° C.) | 150 (83° C.) | 21 | 1.0 | 2000 (1093° C.) | | | | 3156 |
| 830 | 150 | 21 | 1.0 | 1800 (982° C.) | 2809 (1540° C.) | | 3350 (1842° C.) | 3396 |
| 830 | 150 | 21 | 1.0 | 1600 (871° C.) | | | | 3672 |
| 830 | 150 | 21 | 1.1 | 2000 | 2585 (1420° C.) | 46.1 | 3699 (2038° C.) | 2608 |
| 830 | 150 | 21 | 1.1 | 1800 | 2611 (1433° C.) | 43.1 | 3576 (1970° C.) | 2786 |
| 830 | 150 | 21 | 1.1 | 1600 | 2636 (1446° C.) | 40.2 | 3456 (1899° C.) | 2986 |
| 830 | 300 (167° C.) | 21 | 1.1 | 2000 | 2686 (1475° C.) | 42.8 | 3699 (2038° C.) | 2805 |
| 830 | 300 | 21 | 1.1 | 1800 | 2712 (1488° C.) | 39.9 | 3577 (1970° C.) | 3010 |
| 830 | 300 | 21 | 1.1 | 1600 | 2738 (1503° C.) | 37.0 | 3456 (1899° C.) | 3245 |
| 830 | 150 | 21 | 1.2 | 2000 | | | | 2219 |
| 830 | 150 | 21 | 1.2 | 1600 | | | | 2523 |
| 830 | 150 | 21 | 1.2 | 1800 | 2412 (1322° C.) | 51.0 | 3775 (2080° C.) | 2359 |
| 830 | 150 | 30 | 1.0 | 1400 (760° C.) | 3453 (1900° C.) | 30.9 | 3498 (1928° C.) | 3889 |
| 830 | 150 | 30 | 1.1 | 1400 | 3193 (1755° C.) | 37.7 | 3768 (2075° C.) | 3174 |
| 830 | 150 | 30 | 1.2 | 1400 | 2932 (1610° C.) | 44.8 | 4003 (2210° C.) | 2682 |

From Table 2 several characteristics of the process of the present invention will become apparent. First, the fuel efficiency, or specific fuel consumption, is enhanced as the preheat of the primary oxidant or the oxygen to carbon ratio is increased. However, the maximum preheat possible with the direct contact heat exchanger 34 is about 2000° F. (1093° C.) while increasing the oxygen to carbon ratio beyond about 1.2 effects the reducing capability of the atmosphere within the shaft furnace. Second, specific fuel consumption is enhanced when a temperature difference between the gas entering the preheat zone of the furnace and the ferrous burden leaving that zone is about 150° F. (83° C.). Third, even disregarding the cost of oxygen, the process employing preheated air as the primary oxidant provides greater fuel efficiency than the process employing enriched air as the primary oxidant. Fourth, since conventional preheaters using the process parameters here involved are capable of producing a preheat only in the range of 1400° F. (760° C.), advanced preheater technology such as here disclosed is necessary to the most effective practice of the present invention.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. A process for melting a ferrous burden comprising introducing a ferrous burden together with fluxes and additions into the upper region of a shaft furnace, introducing primary oxidant into a heat recovery device, heating said primary oxidant in said heat recovery device; introducing said heated primary oxidant together with fuel into high temperature burners associated with the lower region of said shaft furnace, the oxygen to carbon ratio of the primary oxidant and fuel falling within the range of 0.85 to 1.4; combusting said heated primary oxidant and said fuel in said high temperature burners to produce a reducing atmosphere at a temperature in excess of 3200° F. (1760° C.) and delivering said atmosphere to the lower region of said shaft furnace, said reducing atmosphere containing at least carbon dioxide, carbon monoxide, hydrogen, water vapor and nitrogen; directing said atmosphere through said lower region of said shaft furace and into said upper region of said shaft furnace whereby said ferrous burden in said lower region of said shaft furnace is melted and said ferrous burden in said upper region of said shaft furnace is preheated; introducing a desired amount of secondary oxidant into said upper region of said shaft furnace; combusting a portion of the carbon monoxide and hydrogen contained in the reducing atmosphere from the lower region of said shaft furnace so as to produce a gas temperature at least 150° F. (83° C.) above the metal temperature at the entrance to the melting zone in said lower region of said shaft furnace and a top gas leaving said shaft furnace at a temperature in the range of 600° to 1400° to 1400° F. (316° C. to 760° C.) while preheating the said ferrous burden in said upper region of said shaft furnace to a temperature in the range of 1200° to 1800° F. (648° C. to 982° C.); introducing said top gas and tertiary oxidant into an afterburner; combusting said top gas and said tertiary oxidant to provide a heated flue gas and passing said heated flue gas in heat exchange relationship with said primary oxidant.

2. The process as set forth in claim 1 wherein the fuel is natural gas.

3. The process as set forth in claim 1 wherein the fuel is fuel oil.

4. The process as set forth in claim 1 wherein the fuel is pulverized coal.

5. The process as set forth in claim 2 and comprising, in addition, the step of passing said flue gas through a waste heat exchanger.

6. The process as set forth in claim 3 and comprising, in addition, the step of passing said flue gas through a waste heat exchanger.

7. The process as set forth in claim 4 and comprising, in addition, the step of passing said flue gas through a waste heat exchanger.

8. The process as set forth in claim 1 in which the primary oxidant is enriched air.

9. The process as set forth in claim 2 in which the primary oxidant is enriched air.

10. The process as set forth in claim 3 in which the primary oxidant is enriched air.

11. The process as set forth in claim 4 in which the primary oxidant is enriched air.

12. The process as set forth in claims 1, 2, 3, 4, 5, 6, 7, 8, 9, 10 or 11 in which the secondary oxidant is ambient air.

13. The process as set forth in claims 1, 2, 3, 4, 5, 6, 7, 8, 9, 10 or 11 in which the secondary oxidant comprises a portion of the heated primary oxidant.

14. The process as set forth in claims 1, 2, 3, 4, 5, 6, 7, 8, 9, 10 or 11 in which the secondary oxidant is enriched air.

15. The process as set forth in claims 1, 2, 3, 4, 5, 6, 7, 8, 9, 10 or 11 in which the secondary and tertiary oxidants comprise ambient air.

16. The process as set forth in claims 1, 2, 3, 4, 5, 6, 7, 8, 9, 10 or 11 in which the secondary and tertiary oxidants comprise a portion of the heated primary oxidant.

17. The process as set forth in claims 1, 2, 3, 4, 5, 6, 7, 8, 9, 10 or 11 in which the secondary and tertiary oxidants comprise enriched air.

18. The process as set forth in claim 1 wherein the ferrous burden is preheated to a temperature at which the iron contained in the burden is transformed from the $\alpha$ state to the $\gamma$ state.

19. The process as set forth in claim 18 wherein the primary oxidant is preheated to a temperature in the range of 1400° F. to 2000° F. (760° C. to 1093° C.).

20. The process as set forth in claim 19 and comprising, in addition, the step of passing said flue gas through a waste heat exchanger.

* * * * *

UNITED STATES PATENT AND TRADEMARK OFFICE
CERTIFICATE OF CORRECTION

PATENT NO. : 4,556,418

DATED : December 3, 1985

INVENTOR(S) : Andrew J. Syska

It is certified that error appears in the above-identified patent and that said Letters Patent are hereby corrected as shown below:

Col. 6, line 32   "burned" should be --burden--

Col. 11, line 36  "effects" should be --affects--

Ccl. 12, line 39  "furace" should be --furnace--

Col. 12, line 52  delete "to 1400°F" second occurrence

Signed and Sealed this

Twenty-seventh Day of October, 1987

Attest:

DONALD J. QUIGG

*Attesting Officer*   *Commissioner of Patents and Trademarks*